April 8, 1958     W. O. MITCHELL ET AL     2,829,685
POWER OPERATED SCREW DRIVER
Filed Jan. 31, 1957
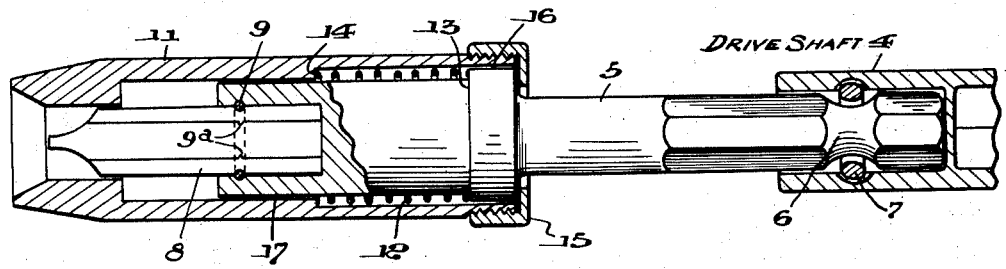
Fig. 1.
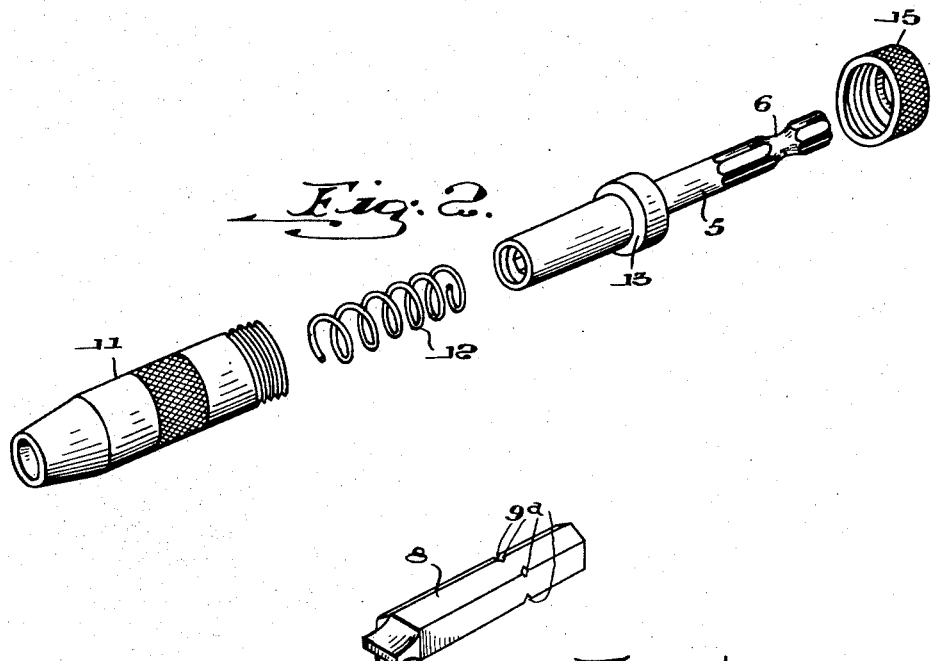
Fig. 2.
Fig. 3.
INVENTORS.
WALTER O. MITCHELL,
JOHN E. AHEARN.
BY Archworth Martin
their ATTORNEY.

United States Patent Office 2,829,685
Patented Apr. 8, 1958

2,829,685

POWER OPERATED SCREW DRIVER

Walter O. Mitchell, Fredonia, and John E. Ahearn, Grove City, Pa., assignors to The Hommel Corp., Grove City, Pa., a corporation of Pennsylvania Application January 31, 1957, Serial No. 637,574

4 Claims. (Cl. 144—32)

Our invention relates to screw drivers, and more particularly to those of the type that will usually be mechanically driven, as from a flexible shaft to the end of which the screw driver shank or stem is connected.

One object of our invention is to provide a screw driving mechanism of the type referred to wherein the stem or shank that carries the screw driver bit is supported in axially-spaced bearings in such manner that there will be no appreciable lateral vibration or wobbling.

Another object of our invention is to provide a tool wherein the parts may readily be disassembled and assembled for replacement of bits, or other purposes.

Another object of our invention is to provide a guide sleeve that serve as a guide or centering device for holding the bit in engagement with a screw slot, and which can be readily moved backwardly from the bit to expose the same when placing it into the notch of a screwhead, the sleeve when held in the operator's hand serving also as a bearing sleeve for the bit shank.

In the accompanying drawing:

Fig. 1 is a longitudinal sectional view through the apparatus showing the centering sleeve in projected position relative to the bit.

Fig. 2 is an exploded view of the various elements shown in Fig. 1.

Fig. 3 is a perspective view of the screw driver bit.

The tool is shown as applied to a driving socket 4 of conventional form which may in turn be driven from a flexible shaft or other driving devices. The bit holder comprises a shank or stem portion 5 that is of polygonal shape to prevent rotation thereof in the socket 4, the stem being grooved at 6 for engagement with a spring wire ring 7 that is expansible into a circular slot in the socket 4 when the stem is forcibly inserted into or withdrawn from the socket.

At its forward end the stem 5 has a socket of polygonal form in cross section and which serves as a seat for a bit 8. The bit having snug fit with the socket and being releasably held thereon by a spring ring 9 which engages roughened or nicked corners 9a of the bit 8 and is expansible into an annular groove in the socket, to permit removal and replacements of bits.

A centering and bearing sleeve 11 will usually be held in the hand of the operator while the stem 5 is being rotated therein. A spring 12 is positioned between shoulders 13 and 14 on the stem and the sleeve respectively and urges the sleeve forwardly to the position shown in Fig. 1. A collar 15 limits expansive movement of the spring but is removable to permit disassembly of the parts, particularly when it is desired to replace a bit 8.

When it is desired to apply the bit 8 to a screw, the sleeve 11 will be drawn backwardly from the position shown in Fig. 1 to expose the bit which can then readily be placed in the notch of a screwhead. Release of the sleeve will allow it to be projected forwardly so that its forward edge will seat against the surface into which the screw is to be driven and thereby reduces danger of the bit slipping out of the screw notch.

Another feature of our invention resides in the provision of a neat bearing fit between the stem and the sleeve at each of the areas 16 and 17 so that there will be no wobbling or chattering of the bit in the sleeve, that would disturb the engagement of the bit in the screwhead. This maintenance of a good driving connection between the bit and the screwhead is furthered by the operator holding the sleeve 11 tightly against the surface of the work.

The short, readily replaceable bit 8 and the socketed stem 5, can economically be used without the sleeve, because it is unnecessary to replace the entire stem when a bit becomes worn, or a bit of another size is desired.

We claim as our invention:

1. A power-driven screw driver that comprises a bit-holding stem that is provided at its rear end with means for connecting it to a drive shaft and having a socket at its forward end, a bit carried by the socket, a sleeve that surrounds the socket of the stem and extends rearwardly, the stem being rotatable in the sleeve an annular shoulder in the sleeve intermediate its ends, an annular shoulder on the stem, near the rear end of the sleeve, a coil spring interposed between the said shoulders and yieldably holding the sleeve forwardly projected to a position where it is disposed in circumferentially-spaced relation to the forward edge of the bit, the sleeve being retractible against the spring, and a collar that detachably connects the sleeve rotatably to the second-named annular shoulder.

2. A screw driver as defined in claim 1, wherein the periphery of the last named shoulder serves as a bearing for the stem in the sleeve and an intermediate portion of the sleeve that surrounds the bit socket serves as another bearing for the stem.

3. A screw driver as defined in claim 2, wherein the sleeve is of a length to be readily held in the hand of an operator and the said intermediate portion of the sleeve that serves as a bearing is adjacent to the other end of the sleeve.

4. A power driven device that comprises a tool holding stem provided at its rear end with means for connecting it to a drive shaft and having a socket at its forward end, a tool removably carried by the socket, a sleeve that loosely surrounds the socket of the stem and extends rearwardly, the stem being rotatable in the sleeve, an annular shoulder in the sleeve intermediate its ends, an annular should on the stem within the rear end portion of the sleeve, a coil spring interposed between the said shoulders and yieldably holding the sleeve forwardly projected to a position where it is disposed in circumferentially spaced relation to the forward edge of the tool, the sleeve being retractable against the spring, and a retaining member releasably limiting forward movement of the sleeve under the spring pressure, the sleeve being removable from the stem in a forward direction upon disengagement of said retaining member therefrom.

References Cited in the file of this patent

UNITED STATES PATENTS

| 701,941 | Rowlands | June 10, 1902 |
| 1,858,276 | Miller | May 17, 1932 |
| 2,272,279 | Schindel | Feb. 10, 1942 |
| 2,484,364 | Whitledge | Oct. 11, 1949 |
| 2,522,217 | Fischer et al. | Sept. 12, 1950 |
| 2,671,484 | Clark | Mar. 9, 1954 |
| 2,684,698 | Shaff | July 27, 1954 |
| 2,782,823 | Williams | Feb. 26, 1957 |